United States Patent [19]

Wurdack

[11] Patent Number: 5,447,386
[45] Date of Patent: Sep. 5, 1995

[54] SYSTEM FOR LOCKING FURNITURE PANELS

[75] Inventor: Kirk Wurdack, Warrenton, Mo.

[73] Assignee: Renovisions, Inc., Edgemont, Pa.

[21] Appl. No.: 86,998

[22] Filed: Jul. 1, 1993

[51] Int. Cl.$^6$ ............................................. F16B 12/02
[52] U.S. Cl. ................................... 403/403; 403/205; 403/231; 403/407.1; 520/272; 520/285.1
[58] Field of Search .................. 403/403, 401–402, 403/405.1, 406.1, 407.1, 205, 231, 382, 294, 295, DIG. 10; 52/584.1, 272, 282.2, 282.4, 282.5, 284, 285.1, 285.3, 285.4; 160/105

[56] References Cited

U.S. PATENT DOCUMENTS

| | | | |
|---|---|---|---|
| 1,919,780 | 7/1933 | Fairbank | 403/407.1 X |
| 3,490,797 | 1/1970 | Platte | 403/407.1 X |
| 3,751,056 | 8/1973 | Wightman . | |
| 3,859,767 | 1/1975 | Aspenwall . | |
| 3,882,785 | 5/1975 | Rowe . | |
| 4,126,230 | 11/1978 | Tyson et al. . | |
| 4,261,148 | 4/1981 | Scott . | |
| 4,393,738 | 7/1983 | Heyden . | |
| 4,464,075 | 8/1984 | Kellogg | 403/407.1 X |
| 4,550,839 | 11/1985 | Good . | |
| 4,784,509 | 11/1988 | Gozzano | 403/403 X |
| 5,071,281 | 12/1991 | Murphy et al. . | |
| 5,114,018 | 5/1992 | Bischoff et al. . | |
| 5,155,960 | 10/1992 | Shaanan . | |
| 5,160,212 | 11/1992 | Vauhkonen . | |
| 5,185,982 | 2/1993 | Hostetler . | |
| 5,313,751 | 5/1994 | Wittler | 160/135 X |

FOREIGN PATENT DOCUMENTS 857075 12/1960 United Kingdom ............... 403/403
1567000 5/1980 United Kingdom ............... 403/231

Primary Examiner—Randolph A. Reese
Assistant Examiner—Harry C. Kim
Attorney, Agent, or Firm—Ratner & Prestia

[57] ABSTRACT

The present invention provides a system for joining two furniture panels to prevent relative vertical movement there between. In a first embodiment for joining two furniture panels disposed at right angles, the invention comprises two forks. The primary fork comprises an elongated base having three coplanar equally-spaced tines arranged along the length of the base and extending from the base in a direction perpendicular to the length of the base. The primary fork also includes three coplanar equally-spaced slots extending through the base in a direction perpendicular to the direction of the tines. The second, or locking, fork comprises an elongated flat planar body having two faces and three flat elongated coplanar equally-spaced tines arranged thereon. The tines are arranged along the length of the body and protrude from one edge of one face of the body, to extend in a direction perpendicular to the length of the body. In a second embodiment for joining two furniture panels disposed adjacent one another within a single plane, the apparatus comprises an elongated base having two parallel, spaced apart rows of tines as previously described extending from the base in a direction perpendicular to the length of the base.

18 Claims, 5 Drawing Sheets

SYSTEM FOR LOCKING FURNITURE PANELS

BACKGROUND OF THE INVENTION

Many modern office building utilize modular furniture to create work spaces for employees. The reasons for this are several, but one main reason is that modular furniture is very convenient. It comprises a series of panels, each approximately 5½ ft. high and 6 ft. wide. The panels can be secured together to form a maze of work spaces in nearly any desired configuration. Each panel is equipped with feet upon which the panel rests. In most cases, the height of the feet is adjustable in order to allow the user to level the panel.

Each panel is also equipped with accessory hanging tracks. These tracks general comprise metal strips embedded vertically into the face of the panel. Generally two accessory hanging tracks are embedded into face of each panel near the two ends of the panel. The accessory hanging tracks include a series of slots arranged vertically down the metal strip. The tracks extend through the panel with slots also extending through the panel. The tracks can therefore be accessed from either side of the panel.

The tracks are used to hang desks, bookshelves, or other accessories from the panel. Such accessories have hooks adapted to mate with the slots of the panel. The accessories are thus cantilevered off the accessory hanging tracks embedded in the panel. For this reason, the accessory hanging tracks must be quite strong in order to be able to carry the full weight of a desk or loaded bookshelf.

Power, phone and computer network wires are generally arranged in raceways at the bottom of each panel. In this way, electricity, phone, and computer communications can be delivered to each workstation.

The furniture is also modular, and thus may be used in many different configurations. If a change in the arrangement of the office or the location of the office is necessary, the furniture panels may be broken down, transported, and reassembled. If individual workstations and offices were built instead, it would be difficult if not impossible to move the built-in partitions and moving would therefore require a considerable amount of extra expense.

Modular furniture is free-standing and subject to rearrangement. Therefore, in an office space in which modular furniture is located, the entire floor is generally covered with some sort of a floor covering. Carpet is the floor covering of choice for many modern offices for many reasons including cost, noise suppression, and comfort. Since the entire floor is covered with carpet, the furniture may be rearranged without the need to re-lay carpeting. However when the carpeting wears out, the modular furniture must be disassembled so that new carpeting can be laid.

Accordingly, it is preferred not to use broadloom carpeting in offices in which modular furniture will be installed. Rather carpet tiles or carpet squares can be used to carpet the area. These tiles or squares are about 18 inches square and when worn or damaged can be replaced individually. Thus one may replace the carpet tiles in the high traffic area such as frequently used pathways, without replacing an entire room full of carpeting. However, in the past, when the carpeting was sufficiently worn that entire rooms were to be recarpeted, or for redecorating purposes, an entire constructed unit of modular furniture would be disassembled so that the old carpet could be removed and new carpet squares laid in order to replace those squares upon which the modular furniture rested.

Such a procedure is generally quite expensive and disruptive to the business. Each desk and work area must be cleared of all business supplied and personal items. Computer connections must be broken and the computers removed. Each desk must be removed from the furniture panels, as must all bookshelves and other accessories. All electrical, telephone, and computer network systems must be removed from the panels. The panels can then be disassembled. The panels and accessories must then be stored while the old carpet is being removed and new carpet installed. Once the new carpet is installed, all of the furniture must then be reassembled on top of the new carpet. Where an office is relatively small and consists of only 20–30 workstations, the entire process of disassembly, replacement of carpet, and reassembly can generally be accomplished over a weekend or long weekend while business would not otherwise be conducted by the office. However in larger offices carpet removal and replacement could cause a substantially longer disruption period.

In order to avoid such a substantial disruption, carpet installers have attempted to raise modular furniture slightly off the floor in order to allow carpet tiles to be removed and replaced underneath the furniture while it is suspended. Generally, each panel is connected to adjoining panels on each side. These connections are designed to prevent horizontal movement of each panel with respect to its neighboring panels. This configuration adds strength and rigidity to the overall configuration of the office furniture panels. However these connections are not designed to support the weight of one panel by another. Thus attempting to raise a single panel off the floor gives rise to problems with respect to its neighboring panels. Thus in order to lift office furniture panels, the panels should first be secured together to prevent relative vertical movement between the panels. Relative horizontal movement is generally prevented by the standard connections between the panels. However no system for interconnecting adjacent panels to prevent relative vertical movement therebetween has heretofore been available.

SUMMARY OF THE INVENTION

The present invention provides a system for joining two furniture panels to prevent relative vertical movement there between. In a first embodiment for joining two furniture panels disposed at right angles to one another, the invention comprises two forks. The first or primary fork comprises an elongated base having three coplanar equally spaced tines arranged along the length of the base and extending from the base in a direction perpendicular to the length of the base. The primary fork also includes three coplanar equally spaced slots arranged along the length of the base and extending through the base in a direction perpendicular to the direction of the tines and also perpendicular to the length of the base. The second fork, or locking fork comprises an elongated flat planar body having two faces and three flat elongated coplanar equally spaced tines arranged thereon. The tines are arranged along the length of the body and protrude from one edge of one face of the body, to extend in a direction perpendicular to the length of the body.

In a second embodiment for joining two furniture panels disposed adjacent one another within a single plane, the apparatus comprises an elongated base having two rows of tines extending therefrom. Each row of tines includes a plurality of individual flat elongated coplanar tines arranged along the length of the base and extending from the base in a direction perpendicular to the length of the base. The two rows of tines extend in parallel directions but are spaced apart.

DETAILED DESCRIPTION OF THE INVENTION

Figure 1:
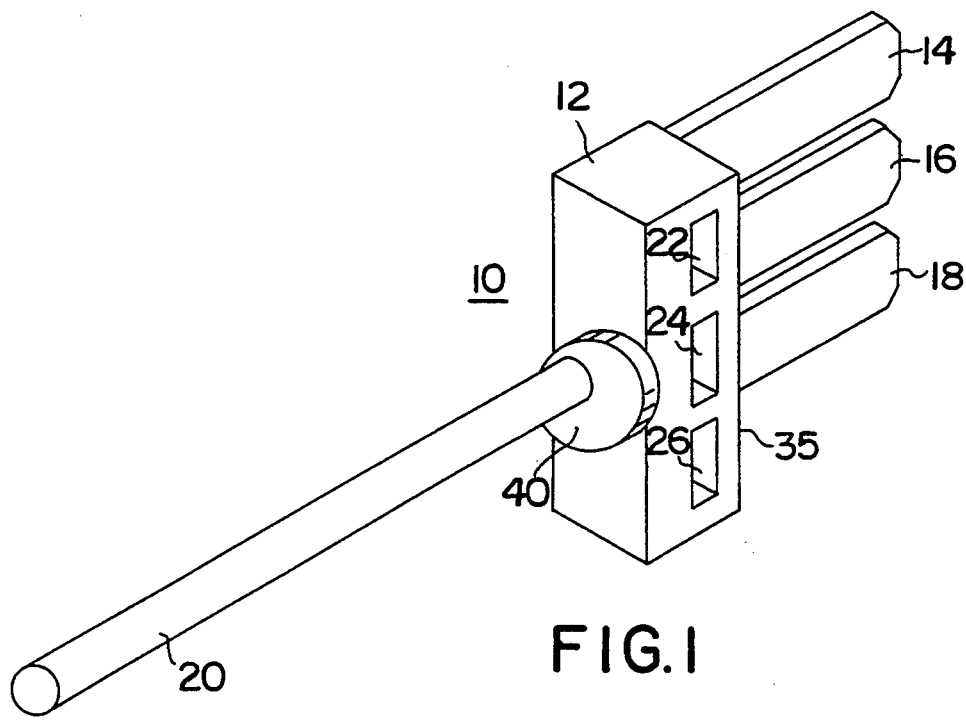
FIG. 1 is a perspective view of the primary fork of the first embodiment of the present invention.

FIG. 1 shows the primary fork 10 of the first embodiment or corner brace of the present invention. The primary fork consists of an elongated base 12 which has three elongated equally-spaced tines 14, 16, and 18 protruding therefrom. As shown in FIG. 1, base 12 is elongated vertically, and tines 14, 16, and 18 extend perpendicularly to the long axis of elongated base 12, that is they extend horizontally from base 12 along the length of base 12. Base 12 is generally a rectangular box, that is it has one pair of square sides and two pairs of rectangular sides. However base 12 may be cylindrical or some other shape if desired.

Tines 14, 16, and 18 are generally elongated planer members. The tines should have sufficient thickness for structural rigidity since they transfer force to and from the panel which they contact. The particular size and spacing of the tines 14, 16 and 18 will depend primarily upon the accessory hanging tracks 110 on the furniture panels 100 and 102 to be locked and lifted, although tines 14, 16, and 18 will nearly always be equally-spaced. That is, the distance between tines 14 and 16 will be the same as the distance between tines 16 and 18.

Primary fork 10 also includes three coplanar equally spaced slots 22, 24, and 26. These slots also extend along the length of elongated base 12, but extend perpendicular to tines 14, 16, and 18. Again the spacing of slots 22, 24, and 26 will depend upon the spacing of the slots in accessory hanging tracks 110. This is dependent upon the configuration of locking fork 30 shown in FIG. 2.

Figure 2:
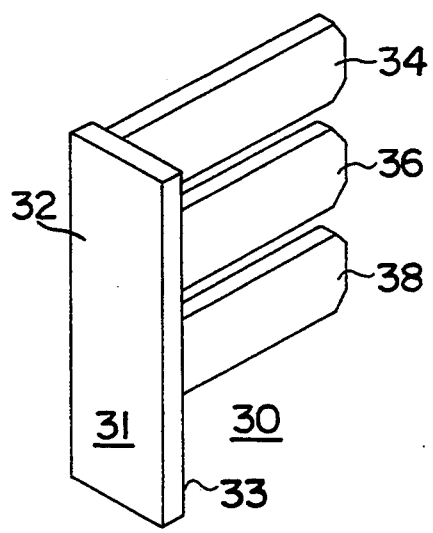
FIG. 2 is a perspective view of the locking fork of the first embodiment of the present invention.

Locking fork 30 comprises an elongated flat planer body 32 having two rectangular faces 31 and 33. As shown in FIG. 2 body 32 is generally rectangular, however other shapes may be used if desired. Protruding from one edge of elongated body 32 are tines 34, 36, and 38. Elongated tines 34, 36, and 38 are generally planar in shape and should have the same configuration as elongated tines 14, 16, and 18 on primary fork 10. The only difference is that tines 34, 36, and 38 will generally be longer than tines 14, 16, and 18 since the tines on locking fork 30 must pass through base 12 of primary fork 10 before passing through slots 112 in accessory hanging track 110 on furniture panel 102. Primary fork 10 is generally equipped with handle 20 which aids insertion and removal of the fork. Locking fork 30 may also be equipped with a handle for this purpose.

Figure 5:
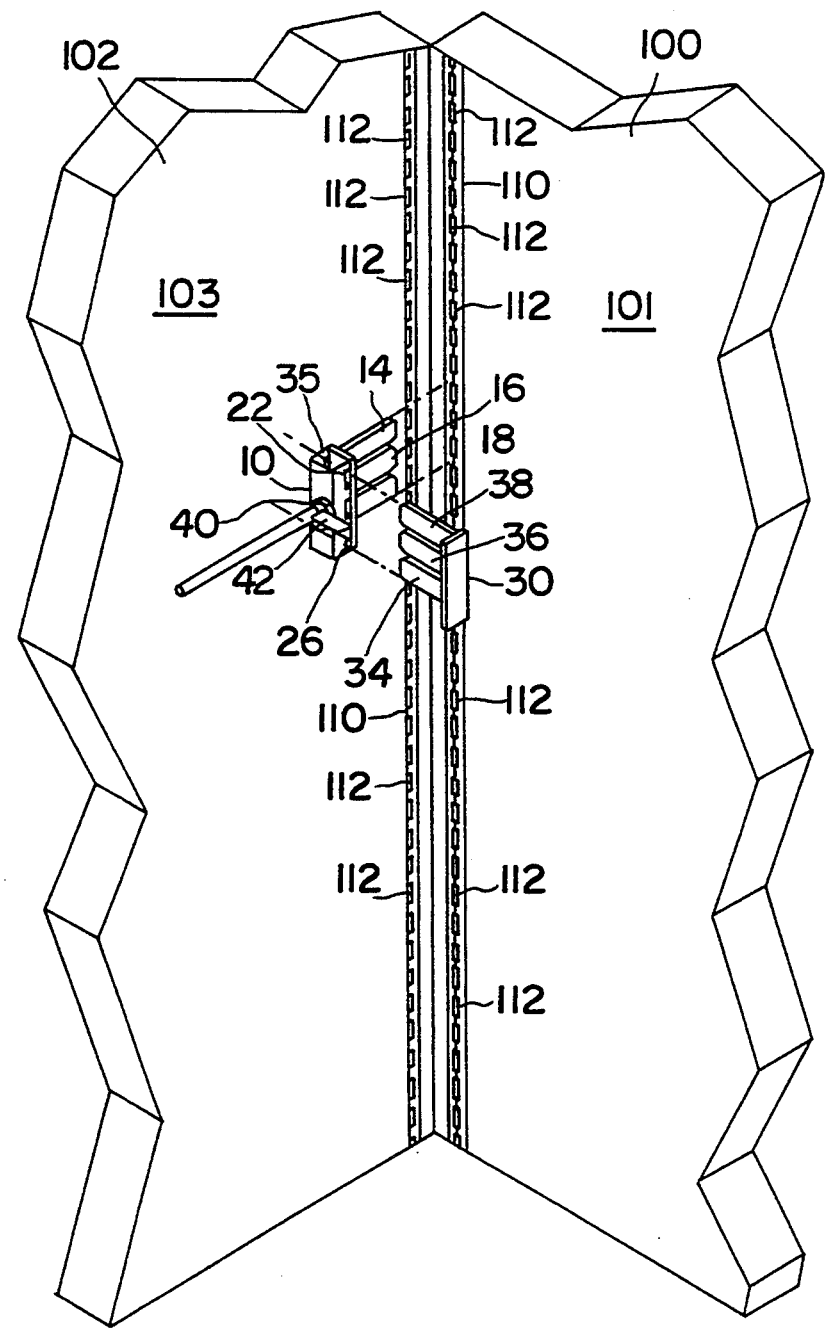
FIG. 5 is a perspective view of the first embodiment of the present invention showing the relationship by which the primary and locking forks engage both the furniture panel and one another.

Referring now to FIG. 5, two furniture panels 100 and 102 are arranged at a right angles to one another, such as in the corner of a workstation. Generally, there is some mechanism (not shown) which holds the two furniture panels 100 and 102 in a fixed horizontal relationship. That is, generally bolts and a connector, square brackets, or some other appropriate means for holding the two panels at a right angle to one another. However, such a connector unit should not be used to suspend one panel while another, connected panel is lifted. The connector unit is designed to prevent horizontal movement of the panels and might be damaged if used to lift the panels.

Figure 3:
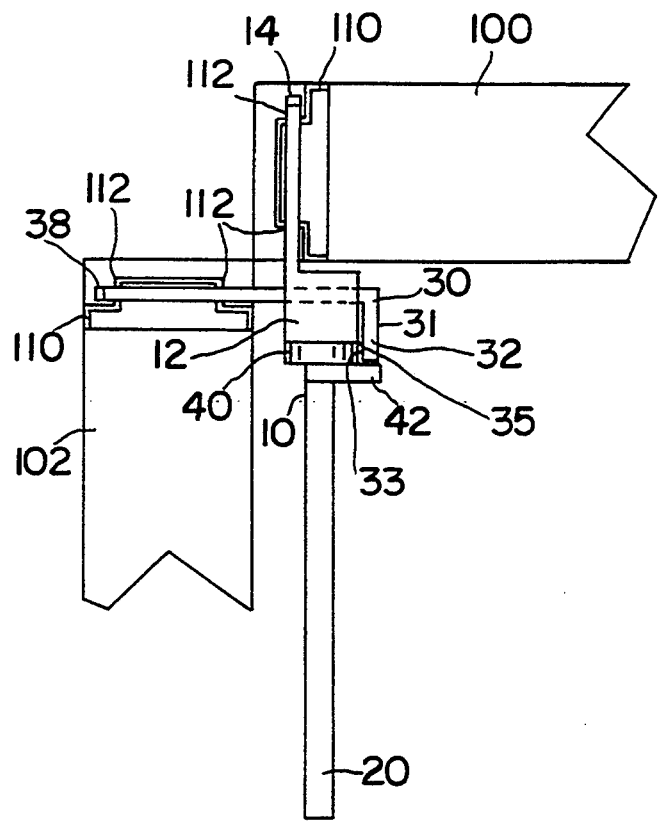
FIG. 3 is a cross-sectional view of the system of the first embodiment of the present invention wherein the primary and locking forks are locked together to hold furniture panels.

To lock panels 100 and 102 together vertically, primary fork 10 is inserted into slots 112 in accessory hanging track 110 on furniture panel 100. Accessory hanging tracks 110 are located on the faces 101 and 103 of furniture panels 100 and 102 respectively as discussed previously in the background section hereof. As shown in FIG. 3, tines 14, 16 and 18 should be long enough to extend completely through accessory hanging track 110 in furniture panel 100. In this way tines 14, 16 and 18 engage slots 112 on both sides of accessory hanging track 10. Once primary fork 10 is in place, slots 22, 24, and 26 will necessarily be aligned with slots 112 on accessory hanging track 110 in furniture panel 102 such that the tines 38, 36, and 34 of locking fork 30 may be passed through both the slots in primary fork 10 and the slots in accessory hanging track 110 on furniture panel 102. Thereafter tines 38, 36, and 34 of locking fork 30 are inserted through slots 22, 24, and 26 in primary fork 10 and through slots 112 in accessory hanging track 110 on furniture panel 102. Once tines 38, 36, and 34 of locking fork 30 are inserted in this way, panels 100 and 102 are locked together to prevent vertical movement of one panel with respect to the other.

As shown in FIG. 2 elongated body 32 appears considerably wider than necessary to accommodate tines 34, 36, and 38. Indeed, if body 32 is made more narrow, locking fork 30 may be inserted into primary fork 10 in either of two ways, with tine 38 extending through slot 22 and tine 34 extending through slot 26, or with tine 38 extending through slot 26 and tine 34 extending through slot 22. While such a configuration will lock furniture panels 100 and 102 together, it is not desirable to use such configuration. As shown in FIG. 2, elongated body 32 is wide. As may be seen from FIG. 3, this necessitates arranging locking fork 30 such that tine 38 extends through slot 22 and tine 34 extends through slot 26. In either configuration, of course, tine 36 extends through slot 24 but in the configuration shown in FIG.

2, elongated body 32 extends beyond the edge 35 of elongated base 12 of primary fork 10.

Once the forks are joined together locking the furniture panels, it can be very difficult to release locking fork 30 to free primary fork 10 and panels 100 and 102. Accordingly, primary fork 10 may be equipped with an eccentric cam 40. Eccentric cam 40 is essentially a thick disk, with a hole drilled off center through the disk. Through this hole is inserted handle 20. Through a well known key slot mechanism, or other suitable means, eccentric cam 40 may be locked rigidly to handle 20. Handle 20 is then configured to turn freely in elongated base 12.

Figure 4:
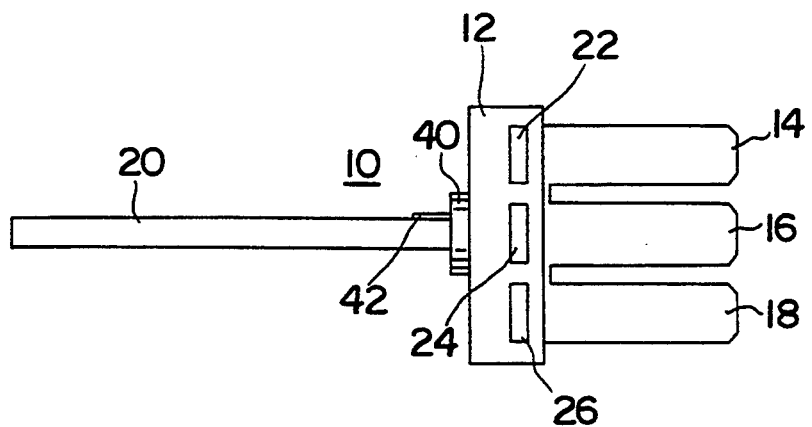
FIG. 4 is a side view of the primary fork of the first embodiment of the present invention.

As shown in FIG. 1, eccentric cam 40 protrudes beyond the edge of elongated base 12. However by rotating handle 20 in a counter clockwise direction as shown in FIG. 1, it may be easily seen that cam 40 will be retracted beyond the edge of elongated base 12. Such a configuration is shown in FIG. 3. Thus when locking fork 30 is inserted through base 12 of primary fork 10, elongated body 32 of locking fork 30 overhangs eccentric cam 40. In this way, when handle 20 is twisted clockwise as shown in FIG. 1, cam 40 will push elongated body 32 out and away from elongated base 12, thereby releasing locking fork 30 from primary fork 10. In order to facilitate rotating handle 20 and cam 40 to free locking fork 30, handle 20 is equipped with a lever 42 as shown in FIGS. 3, 4, and 5. Lever 42 is not shown in FIG. 1 so that eccentric cam 40 may be more easily seen. Lever 42 may be any suitable configuration but is generally an elongated planar member protruding from handle 20 perpendicularly to the length of handle 20.

Finally, it should be understood that although primary fork 10 and locking fork 30 are each shown with 3 tines, and primary fork 10 is shown with 3 slots, forks with fewer tines and slots or a greater number of tines and slots could be created and would function in substantially the same way to lock furniture panels 100 and 102 together, as the three-tined and slotted forks shown in FIGS. 1 through 5 function.

Figure 6:
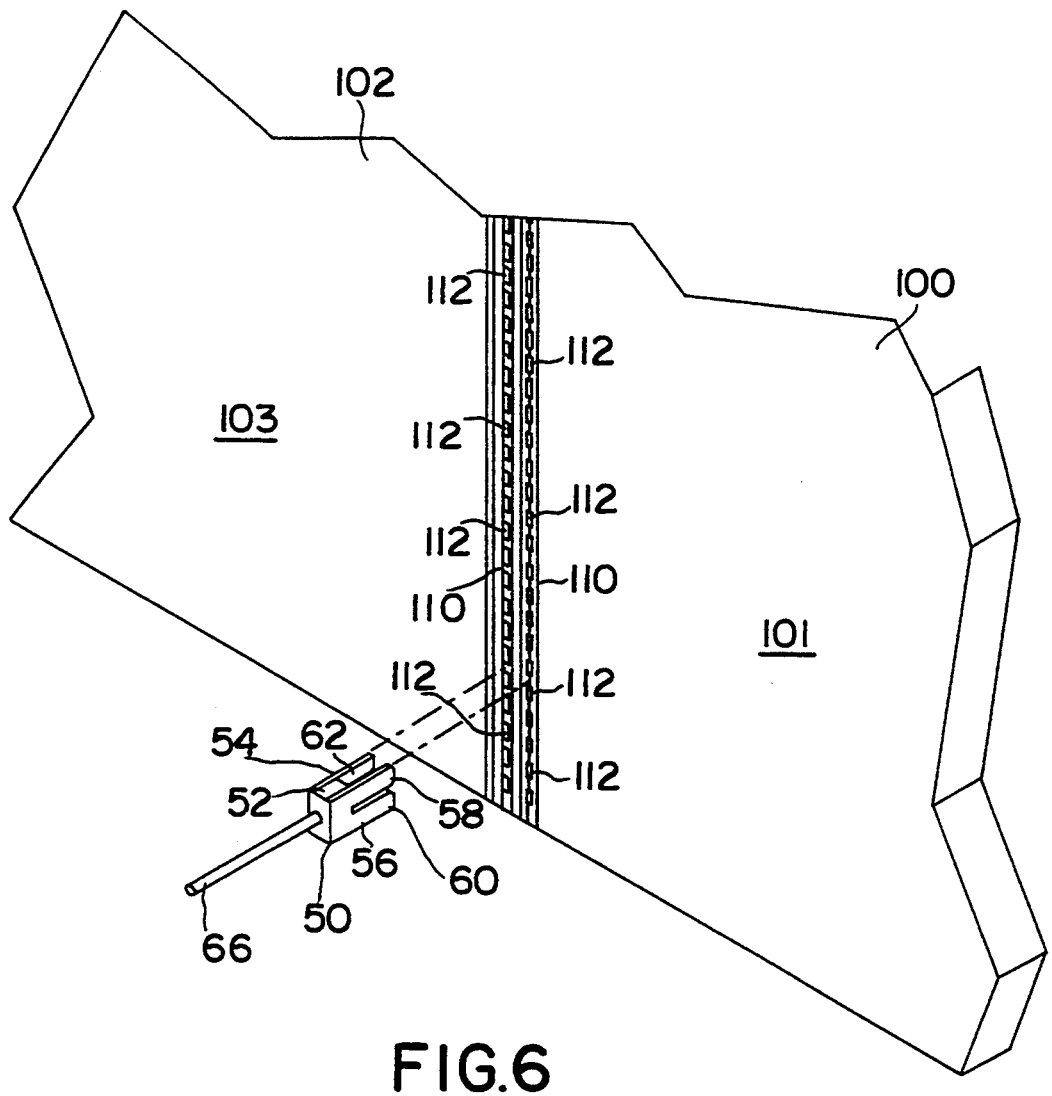
FIG. 6 is a perspective view of the apparatus of the second embodiment of the present invention showing the relationship by which the apparatus locks two adjacent furniture panels.
Figure 7:
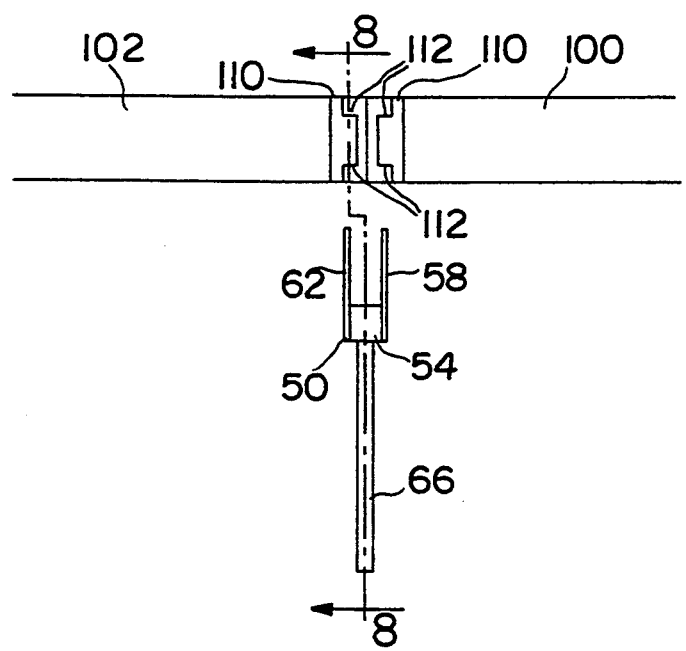
FIG. 7 is a cross-sectional view of the apparatus of the second embodiment of the present invention and its relationship to two adjacent furniture panels.
Figure 8:
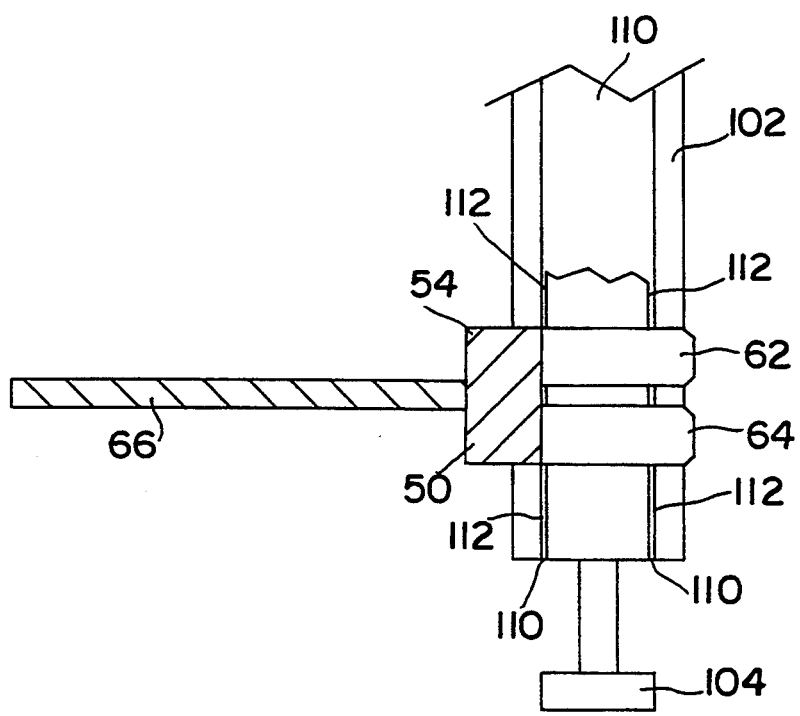
FIG. 8 is a cross-sectional view taken along the line 8—8 of FIG. 7 when the apparatus of the second embodiment of the present invention is inserted to lock two adjacent furniture panels.

A second embodiment of the present invention, parallel locking fork 50, is shown in FIG. 6, 7 and 8. As shown in FIG. 6, parallel locking fork 50 comprises an elongated base 52 and two rows 54 and 56 of tines extending therefrom. As shown in FIGS. 6, 7, and 8 elongated base 52 comprises a rectangular box. However a cylinder or other configuration may be used in place thereof if desired. Row 56 comprises a plurality of tines 58 and 60. Each tine is an elongated flat planar member, of the configuration described with respect to tines 14, 16, and 18. They differ from tines 34, 36 and 38 in that they need not be long enough to pass through elongated base 12 of primary fork 10. However tines 58 and 60 of row 56 as well as tines 62 and 64 of row 54 should be of sufficient length to pass completely through accessory handing tracks as 110 shown in FIG. 8.

As shown in FIG. 6, where furniture panels 100 and 102 are adjacent and arranged in a single plane, parallel locking fork 50 can be inserted through slots 112 in adjacent accessory hanging tracks 110 in furniture panels 100 and 102. In this case, parallel locking fork 50 may be used as shown in FIG. 6 or upside down from the position shown in FIG. 6. For convenience, parallel locking fork 50 also includes handle 66. FIG. 8 shows parallel locking fork 50 extending through slots 112 in accessory hanging track 110 in furniture panel 102. In FIG. 8 the foot 104 of furniture panel 102 may also be seen. As with the first embodiment of this invention, a greater number of tines may be used in parallel rows in parallel locking fork 50, with substantially the same results of locking two panels together. The particular spacing of tines 58, 60, 62 and 64 should be the same as the spacing of tines 14, 16 and 18, and tines 34, 36 and 38.

It is understood that various other modifications will apparent to and can be readily made by those skilled in the art without departing from the spirit and scope of this invention. Accordingly, it is not intended that the scope of the claims appended hereto be limited to the description as set forth herein, but rather that the claims be construed as encompassing all the features of patentable novelty that reside in the present invention, including all features that would be treated as equivalence thereof by those skilled in the art to which this invention pertains.

What is claimed:

1. A system for joining two furniture panels disposed at right angles to one another, each panel having accessory hanging tracks, to prevent relative vertical movement therebetween, comprising:
   a primary fork comprising:
      a six sided elongated rectangular base having three pairs of parallel rectangular planar base faces, one long axis, and first and second short axes;
      a plurality of coplanar, equally spaced flat rectangular tines extending in a first direction from a first planar base face, arranged perpendicularly to said long axis, and extending parallel to said first short axis; and
      three coplanar equally spaced slots arranged perpendicularly to said long axis and extending in a second direction perpendicular to said first direction, said slots extending parallel to said second short axis and passing through a pair of said parallel rectangular planar base faces not including said first planar base face; and
   a locking fork comprising:
      an elongated flat planar body having a predetermined length and width, two parallel faces, and three flat elongated coplanar equally-spaced tines arranged along the length of said body, protruding from one face of said planar body, and extending in a direction perpendicular to the length of said planar body.

2. The system of claim 1 wherein said primary fork includes an eccentric cam rotatably secured to said elongated base opposite said tines.

3. The system of claim 1 wherein said primary fork further includes a handle extending from said elongated base in a direction opposite said first direction.

4. The system of claim 2 wherein said primary fork further includes a handle extending from said elongated base through said eccentric cam, in a direction opposite said first direction.

5. The system of claim 4 wherein said eccentric cam and said handle are rotatable about the center of said handle.

6. The system of claim 5 wherein said handle includes a lever projecting therefrom and perpendicular thereto.

7. The system of claim 4 wherein the width of said locking fork elongated body is sufficient to allow said elongated body to overhang the edge of said elongated base in a direction opposite said first direction.

8. The system of claim 5 wherein the width of said locking fork elongated body is sufficient to allow said elongated body to overhang the edge of said elongated base in a direction opposite said first direction.

9. The system of claim 6 wherein the width of said locking fork elongated body is sufficient to allow said elongated body to overhang the edge of said elongated base in a direction opposite said first direction.

10. A vertically rigid furniture panel unit comprising:
a first furniture panel having at least one accessory hanging track including slots for receiving furniture accessories,
a second furniture panel disposed at a right angle to said first panel, said second panel also having at least one accessory hanging track including slots for receiving furniture accessories;
a primary fork comprising:
a six sided elongated rectangular base having three pairs of parallel rectangular planar base faces, one long axis, and first and second short axes;
a plurality of coplanar, equally spaced flat rectangular tines extending in a first direction from a first planar base face, arranged perpendicularly to said long axis, extending parallel to said first short axis, and extending through said first panel accessory hanging track slots; and
three coplanar equally spaced slots arranged perpendicularly to said long axis and extending in a second direction perpendicular to said first direction, said slots extending parallel to said second short axis and passing through a pair of said parallel rectangular planar base faces not including said first planar base face, said slots aligned with said second panel accessory hanging track slots; and
a locking fork comprising:
an elongated flat planar body having a predetermined length and width, two faces, and a plurality of flat elongated coplanar equally-spaced tines arranged along the length of said body, protruding from one face of said planar body, extending in a direction perpendicular to the length of said planar body, and extending through said primary fork slots and through said second panel accessory hanging track slots.

11. The unit of claim 10 wherein said primary fork includes an eccentric cam rotatably secured to said elongated base opposite said tines.

12. The unit of claim 10 wherein said primary fork further includes a handle extending from said elongated base in a direction opposite said first direction.

13. The unit of claim 11 wherein said primary fork further includes a handle extending from said elongated base through said eccentric cam, in a direction opposite said first direction.

14. The unit of claim 13 wherein said eccentric cam and said handle are rotatable about the center of said handle.

15. The unit of claim 14 wherein said handle includes a lever projecting therefrom and perpendicular thereto.

16. The unit of claim 13 wherein said locking fork elongated body overhangs the edge of said elongated body in a direction opposite said first direction.

17. The unit of claim 14 wherein said locking fork elongated body overhangs the edge of said elongated body in a direction opposite said first direction, 18. The unit of claim 15 wherein said locking fork elongated body overhangs the edge of said elongated body in a direction opposite said first direction.

* * * * *